(12) United States Patent
Tateuchi et al.

(10) Patent No.: US 8,300,005 B2
(45) Date of Patent: Oct. 30, 2012

(54) DISPLAY THAT IMPLEMENTS IMAGE DISPLAYING AND LIGHT RECEPTION CONCURRENTLY OR ALTERNATELY

(75) Inventors: Mitsuru Tateuchi, Kanagawa (JP);
Kazunori Yamaguchi, Kanagawa (JP);
Tsutomu Harada, Kanagawa (JP);
Takeru Tamayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 744 days.

(21) Appl. No.: 11/610,218

(22) Filed: Dec. 13, 2006

(65) Prior Publication Data
US 2007/0132710 A1    Jun. 14, 2007

(30) Foreign Application Priority Data
Dec. 14, 2005    (JP) ................. P2005-360810

(51) Int. Cl.
*G09G 3/36* (2006.01)
(52) U.S. Cl. ........................... 345/104; 345/175
(58) Field of Classification Search ............ 345/87–104, 345/173–175
See application file for complete search history.

(56) References Cited

U.S. PATENT DOCUMENTS

| | | | |
|---|---|---|---|
| 5,293,494 A | | 3/1994 | Saito et al. |
| 5,977,957 A | * | 11/1999 | Miller et al. ............... 345/174 |
| 6,476,797 B1 | * | 11/2002 | Kurihara et al. ............. 345/173 |
| 7,465,914 B2 | * | 12/2008 | Eliasson et al. ............. 250/221 |
| 2002/0190962 A1 | * | 12/2002 | Miura .......................... 345/173 |
| 2003/0122807 A1 | * | 7/2003 | Kataoka et al. ............. 345/204 |
| 2003/0179323 A1 | * | 9/2003 | Abileah et al. .............. 349/24 |
| 2004/0125053 A1 | | 7/2004 | Fujisawa |
| 2004/0155854 A1 | | 8/2004 | Ma et al. |
| 2004/0201579 A1 | * | 10/2004 | Graham ....................... 345/175 |
| 2004/0201583 A1 | | 10/2004 | Burroughes et al. |
| 2005/0099372 A1 | | 5/2005 | Nakamura et al. |
| 2005/0253817 A1 | * | 11/2005 | Rytivaara et al. ............ 345/173 |
| 2005/0270252 A1 | * | 12/2005 | Drader et al. ................ 345/30 |
| 2006/0192766 A1 | * | 8/2006 | Nakamura et al. ........... 345/173 |

(Continued)

FOREIGN PATENT DOCUMENTS
JP    63-163886    7/1988
(Continued)

OTHER PUBLICATIONS

Japanese Office Action for corresponding JP2005-360810 issued on Mar. 16, 2010.
(Continued)

*Primary Examiner* — Chanh Nguyen
*Assistant Examiner* — Sanghyuk Park
(74) *Attorney, Agent, or Firm* — K&L Gates LLP

(57) ABSTRACT

The present invention is to reduce power consumption in a display that concurrently (or alternately) implements light emission and light reception in parallel. A display is provided with a display panel configuration including a plurality of display elements arranged in a matrix and a plurality of light-receiving elements that are disposed adjacent to the plurality of display elements and receive light incident on a display plane. In addition, the display includes a position detector that determines the position of contact or proximity to the display plane based on a light reception signal arising from light reception by the light-receiving elements. Furthermore, the display includes a controller that shifts the displaying state or the position detection state from the low power consumption mode to the normal operation mode if the position detector has determined the presence of contact or proximity in a predetermined state.

3 Claims, 10 Drawing Sheets

U.S. PATENT DOCUMENTS

2006/0284857 A1 * 12/2006 Oh .................................. 345/173

FOREIGN PATENT DOCUMENTS

| JP | 11-008741 | 1/1999 |
| JP | 2000-330526 | 11/2000 |
| JP | 2001-306255 | 11/2001 |
| JP | 2001-325071 | 11/2001 |
| JP | 2004-127272 | 4/2004 |
| JP | 2004127272 | 4/2004 |
| JP | 2004-240971 | 8/2004 |
| JP | 2005-295399 | 10/2005 |
| JP | 2005-300630 | 10/2005 |
| JP | 2005-316462 | 11/2005 |
| JP | 2001-325071 | 11/2007 |
| WO | WO 2004088496 A1 * | 10/2004 |

OTHER PUBLICATIONS

European Search Report dated Feb. 8, 2011, for corresponding patent application No. EP 06 12 6149.

JP Office Action for corresponding Japanese Patent Application No. 2005-360810 dated Jul. 26, 2011.

European Search Report issued Aug. 31, 2011, for corresponding European Appln. No. 06126149.1.

* cited by examiner

| NORMAL OPERATION MODE | | LOW POWER CONSUMPTION MODE |
|---|---|---|
| DISPLAYING | NORMAL DISPLAYING | NORMAL DISPLAYING |
| LIGHT RECEPTION | DETECTION OF RECEIVED LIGHT WITH CYCLE ASSOCIATED WITH DISPLAYING | DETECTION OF RECEIVED LIGHT WITH LONGER CYCLE |

FIG. 11

| NORMAL OPERATION MODE | | LOW POWER CONSUMPTION MODE |
|---|---|---|
| DISPLAYING | NORMAL DISPLAYING | DISPLAYING STOP (BACKLIGHT OFF) |
| LIGHT RECEPTION | NORMAL DETECTION OF RECEIVED LIGHT | DETECTION OF RECEIVED LIGHT WITH BACKLIGHT OFF |

FIG. 12

| NORMAL OPERATION MODE | | LOW POWER CONSUMPTION MODE |
|---|---|---|
| DISPLAYING | NORMAL DISPLAYING | NORMAL DISPLAYING |
| LIGHT RECEPTION | NORMAL DETECTION OF RECEIVED LIGHT | DETECTION OF RECEIVED LIGHT IN SPECIFIC AREA |

# DISPLAY THAT IMPLEMENTS IMAGE DISPLAYING AND LIGHT RECEPTION CONCURRENTLY OR ALTERNATELY

CROSS REFERENCES TO RELATED APPLICATIONS

The present application claims priority to Japanese Patent Application JP 2005-360810 filed with the Japanese Patent Office on Dec. 14, 2005, the entire contents of which being incorporated herein by reference.

BACKGROUND

The present application relates to displays suitably applied to e.g. liquid crystal displays and electro-luminescence (EL) displays, and particularly to a display technique that allows light reception in parallel to light emission.

In an existing display such as a television receiver having on its display screen a touch panel that can be operated through contact to its screen, the touch panel is placed on the display screen as a separate body from the display.

Examples of the configuration employing a touch panel as a separate body include a configuration in which a transparent thin input detection device is attached onto the display screen. This device is a touch sensor employing an electrically conductive film. Types of the device include a pressure-sensitive type device to detect a pressure, an electrostatic capacitance type device to detect electrostatic capacitances, which change depending on contact with a human body. Furthermore, the types include also a device called an electromagnetic induction type device in which positions are input with use of a special pen. In these devices, one separate special panel for position detection is laminated on a face of a display panel.

In the display employing a detection panel attached onto its display panel, the principle of touch detection is simple. However, the display inevitably involves lowering of the display quality because any member is laminated on its display panel. Furthermore, detecting capacitance changes is a main method for detection in the display, which makes it difficult to detect inputs of two or more positions simultaneously.

As a touch panel system employing no additional panel on a display panel, an optical touch panel system is available. In this system, combinations of a light-emitting element (e.g., light emitting diode) and a phototransistor are arranged across the entire panel, and positions are detected based on light shielding by a finger or the like. In such an optical system, no deterioration of the display quality occurs. However, large-scale devices need to be provided around the display, which makes this optical system unsuitable for use in portable apparatuses.

In order to solve disadvantages in these existing touch panels, in recent years, there has been proposed a configuration in which the screen itself of a display is allowed to serve as a touch panel without provision of a separate touch panel. Japanese Patent Laid-open No. 2004-127272 discloses such a display that implements light emission and light reception in parallel.

As an example of the display that implements light emission and light reception in parallel, the following display has been proposed. Specifically, in the display, displaying by display (light-emitting) elements for image displaying, arranged on a display plane formed as e.g. a liquid crystal display, is intermittently implemented. Furthermore, in the period during which the displaying (light emission) is temporarily stopped, light-receiving elements disposed adjacent to the light-emitting elements receive light, so that charges dependent upon the received light are accumulated in the light-receiving elements. In addition, a backlight, which is necessary for a liquid crystal display, is repeatedly turned on and off with being associated with the displaying and the light reception. Alternatively, in the case of an EL display, a light-emitting element itself can be used as a light-receiving element, and the period during which light emission by the light-emitting element is temporarily stopped is defined as a light reception period.

However, in the already proposed display that implements light emission and light reception in parallel, for detection of contact to its screen, there is a need to drive light-receiving elements adjacent to light-emitting elements (or drive light-emitting elements so that they serve as light-receiving elements during a light emission pause period) and detect outputs from the light-receiving elements. Therefore, this display involves a problem of higher power consumption than that of a display that implements only light emission.

In a liquid crystal display requiring a backlight in particular, in order to enhance the accuracy of detection of received light, data of the difference between light received in the backlight-ON state and light received in the backlight-OFF state is often obtained so that received light is detected from the difference data. However, in the configuration that needs lighting of a backlight also for light reception, the backlight needs to be turned on even in a period during which displaying is unnecessary, which problematically leads to extra power consumption.

SUMMARY

The present application is made in view of these problems, and there is a need to reduce power consumption in a display that concurrently (or alternately) implements light emission and light reception in parallel.

According to an embodiment, there is provided a display that implements image displaying and light reception concurrently or alternately. The display includes a plurality of display elements configured to be arranged in a matrix, a plurality of light-receiving elements configured to be disposed adjacent to the plurality of display elements, respectively, and receive light incident on a display plane, a position detector configured to determine the position of contact or proximity to the display plane based on a light reception signal arising from light reception by the light-receiving element, and a controller configured to shift a displaying state or a position detection state from a low power consumption mode to a normal operation mode if the position detector has determined the presence of contact or proximity in a predetermined state.

Due to this configuration, for example, if contact has not been detected for a certain amount of period continuously, the operation mode is changed to the low power consumption mode, so that the state of displaying or position detection is made different from the normal state. Furthermore, if contact is detected, the operation mode is changed to the normal operation mode, so that displaying or position detection in the normal state is implemented. This mode switching can reduce power consumption in the state where contact has been absent continuously.

According to an embodiment, the operation mode is kept at the low power consumption mode if contact has not been detected for a certain amount of period continuously, and the operation mode is returned to the normal operation mode when contact is detected. Thus, power consumption when contact has been absent continuously can be reduced. For example, power consumption reduction can be achieved by, in the low power consumption mode, turning off a backlight to stop displaying or detecting outputs from light-receiving elements with a cycle longer than the normal cycle.

Additional features and advantages are described herein, and will be apparent from, the following Detailed Description and the figures.

BRIEF DESCRIPTION OF THE FIGURES

FIG. 11 is an explanatory diagram showing an example of operation of the respective modes (Example 2) according to an embodiment.

FIG. 12 is an explanatory diagram showing an example of operation of the respective modes (Example 3) according to an embodiment.

DETAILED DESCRIPTION

An embodiment will be described below with reference to FIGS. 1 to 13.

This embodiment is applied to a display constructed as a liquid crystal display. In the embodiment, light-receiving elements are provided adjacent to the respective light-emitting elements included in the liquid crystal display so that light emission (displaying) and light reception (reading) can be implemented in parallel. Hereinafter, the display of the present embodiment, which can implement light emission and light reception in parallel, will be referred to as an I/O display because it allows concurrent image input thereto (light reception) and image output therefrom (displaying). As described later, the I/O display of the present embodiment can detect not only contact as a touch of an object to the screen but also proximity of an object to the screen. Therefore, in the following description, the expression "detection of contact" or the like encompasses also detection of proximity, except in the presence of a particular note.

Figure 1:
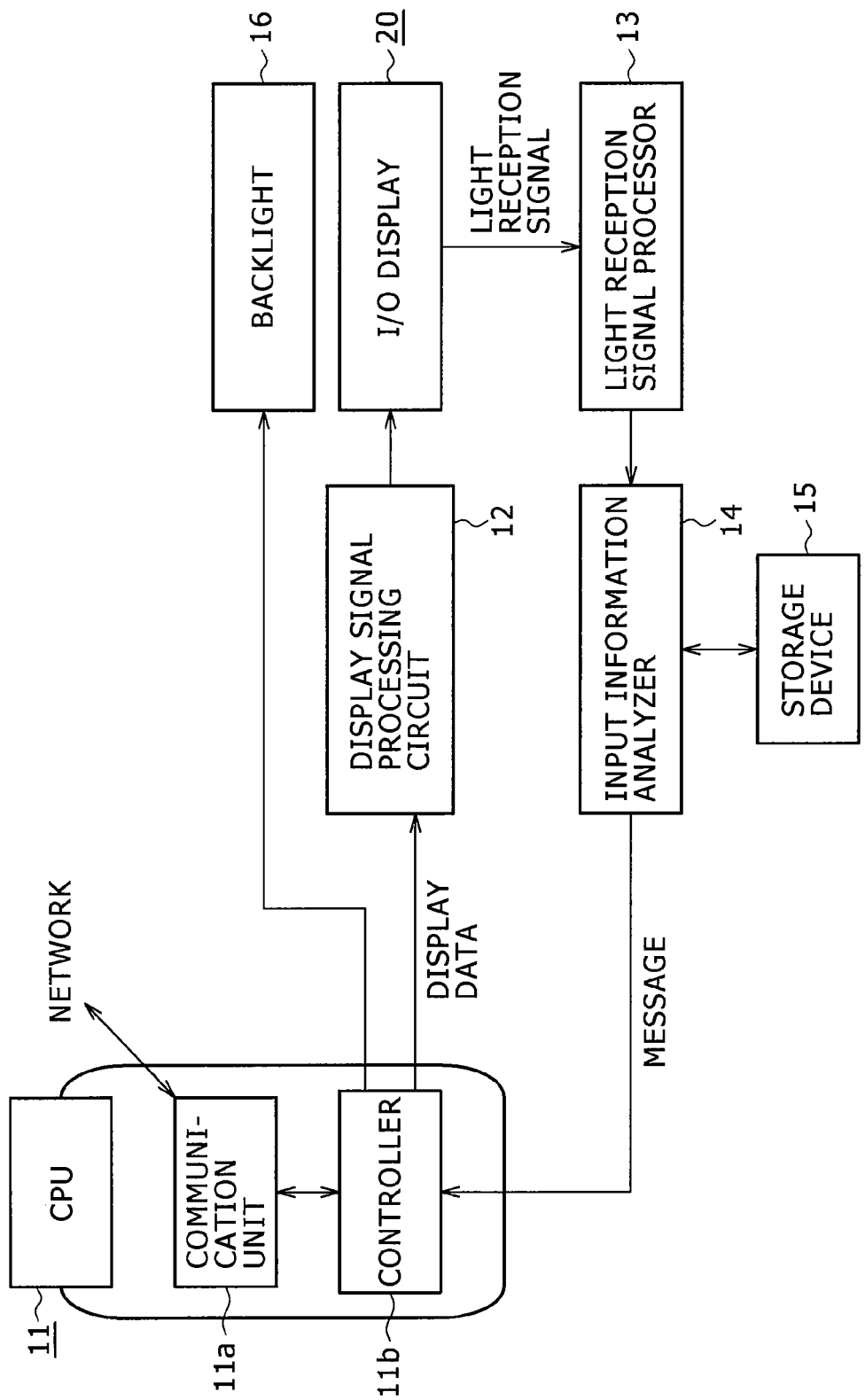
FIG. 1 is a block diagram of a configuration example of a display according to an embodiment.

FIG. 1 is a block diagram showing a configuration example of the display of the present embodiment. A central processing unit (CPU) 11 executes processing to display an image dependent upon an application executed by the CPU 11. Furthermore, the CPU 11 detects contact to the display panel and executes processing dependent upon the contact position on the display panel. The CPU 11 includes a communication unit 11a and thus allows communication via an external network, and a controller 11b executes an application program and so on. An instruction on image displaying from the CPU 11 is transmitted to a display signal processing circuit 12, so that the display signal processing circuit 12 causes an I/O display panel 20 to display images.

The I/O display panel 20 is constructed as a liquid crystal display. Specifically, in the panel 20, transparent electrodes and so on are arranged on a transparent substrate such as a glass substrate, and plural pixels (display elements) are formed in a matrix on a display area (sensor area) 21. Furthermore, a backlight 16 is disposed on the backside of the panel 20. In the present embodiment, e.g. a backlight formed of a plurality of arranged light emitting diodes is used. Thus, the turning on and off of the backlight can be controlled at a comparatively high speed. The control of the turning on and off of the backlight is associated with the display driving by the display signal processing circuit 12. In the driving of the liquid crystal display by the display signal processing circuit 12, drive voltage signals are applied to the pixel electrodes included in the display.

In the I/O display panel 20, plural light-receiving elements are disposed in addition to the display elements. Specifically, the light-receiving elements are arranged in a matrix so as to be adjacent to the respective display pixels in the display area (sensor area) 21 for example. Furthermore, signal charges accumulated depending on the amount of light received by the light-receiving elements are read out based on driving by a light reception signal processor 13.

The light reception signal (difference image signal to be described later) read out and determined by the light reception signal processor 13 is transmitted to an input information analyzer 14, where the contact state or the like is determined based on an image. In this determination, a change of the contact state is also detected by determining the difference from the determination result of the previous frame. Information such as changes of the contact position from predetermined-frame period before is stored in a storage device 15. The determination result is transmitted to the CPU 11 as a predetermined message. The CPU 11 executes predetermined processing depending on the application in execution.

Figure 2:
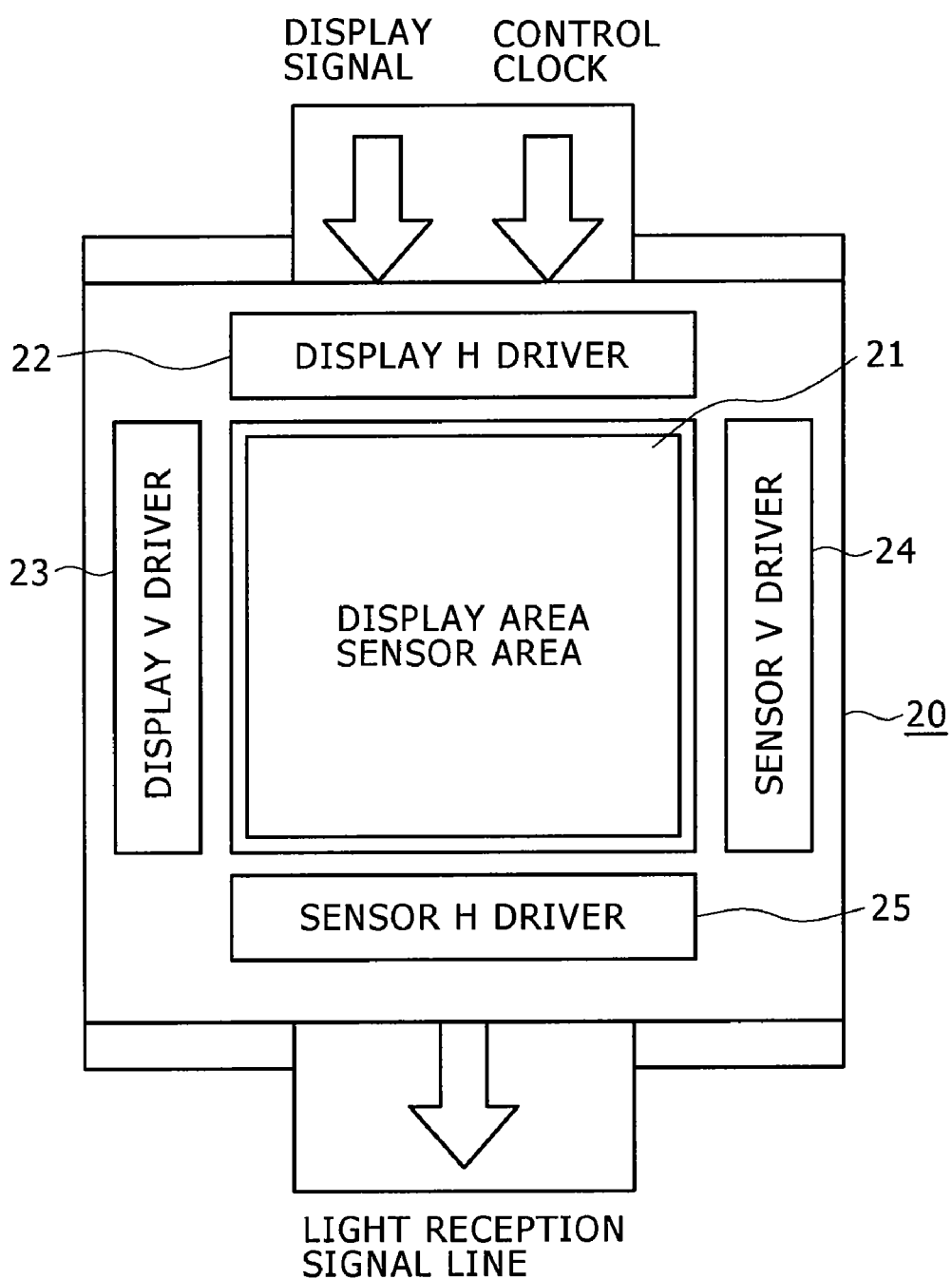
FIG. 2 is a configuration diagram showing an example of a display panel according to an embodiment.

An arrangement example of drivers in the I/O display panel 20 of the present embodiment will be described below with reference to FIG. 2. As shown in FIG. 2, in the I/O display panel 20 that has on the center thereof the transparent display area (sensor area) 21, a display horizontal driver 22, a display vertical driver 23, a sensor vertical driver 24, and a sensor horizontal driver 25 are disposed along four sides of the display area 21. Display signals and control clocks as data for displaying are supplied to the display horizontal driver 22 and the display vertical driver 23, so that the display pixels arranged in a matrix in the display area 21 are driven. Reading-out clocks are supplied to the sensor vertical driver 24 and the sensor horizontal driver 25, so that light reception signals read out in synchronization with the clocks are supplied via a light reception signal line to the light reception signal processor 13.

Figure 3:
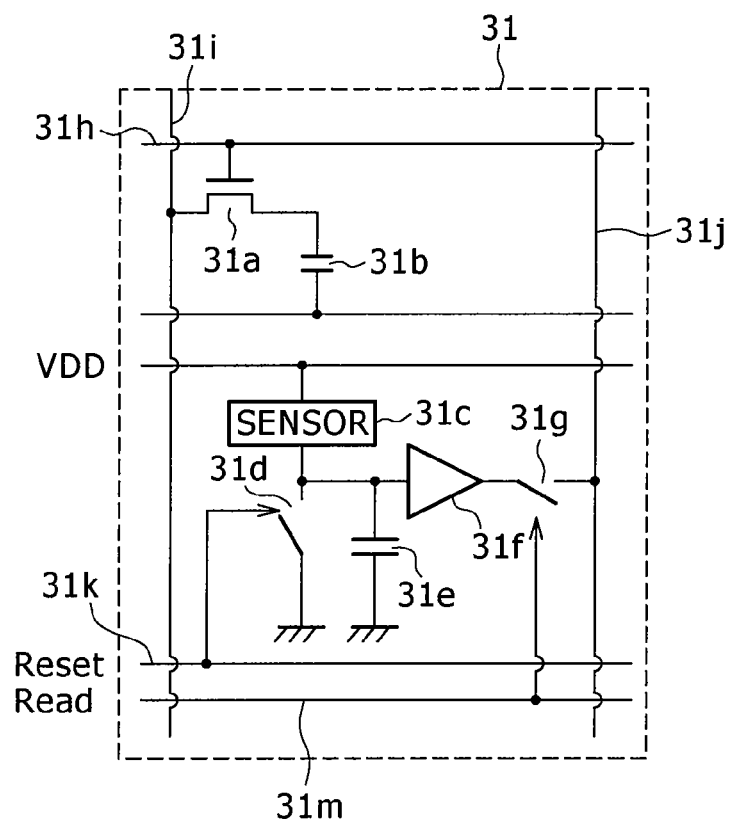
FIG. 3 is a connection diagram showing a configuration example of a pixel according to the embodiment.

FIG. 3 is a diagram showing the configuration of one pixel disposed in the display area 21. As components for displaying included in one pixel 31, a gate electrode 31h and a drain electrode 31*i* are disposed along the horizontal direction and the vertical direction, respectively. Furthermore, a switching element 31*a* is disposed at the intersection between both the electrodes, and connected to a pixel electrode 31*b*. The turning on and off of the switching element 31*a* is controlled by a signal obtained through the gate electrode 31*h*. The displaying state of the pixel electrode 31*b* is defined by a signal supplied through the drain electrode 31*i*.

Furthermore, at the position adjacent to the pixel electrode 31*b*, a light-receiving sensor (light-receiving element) 31*c* is disposed. The light-receiving sensor 31*c* is supplied with a supply voltage $V_{DD}$. The light-receiving sensor (light-receiving element) 31*c* is connected to a reset switch 31*d* and a capacitor 31*e*, so that charges dependent upon the amount of received light are accumulated in the capacitor 31*e* after a reset by the reset switch 31*d*. At the turn-on timing of a read-out switch 31*g*, the voltage proportional to the accumulated charges is supplied via a buffer amplifier 31*f* to a signal output electrode 31*j* so as to be output to the external. The turning on and off of the reset switch 31*d* is controlled by a signal obtained through a reset electrode 31*k*. The turning on and off of the read-out switch 31*g* is controlled by a signal obtained through a read-out control electrode 31*m*.

Figure 4:
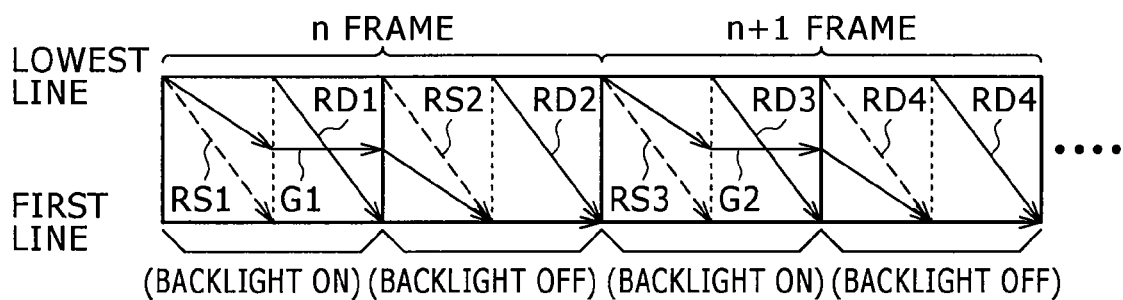
FIG. 4 is a timing diagram showing an example of timings of displaying and light reception according to an embodiment.

FIG. 4 is a diagram showing the state where image displaying (light emission) and light reception are implemented in each frame period. In FIG. 4, the abscissa indicates time while the ordinate indicates the position of the scan line (horizontal line) in which displaying or light reception is implemented. In the example of FIG. 4, rewriting of a display signal and reading of a light reception signal are carried out in such a manner that the scan line is sequentially changed upward from the lowest line in one screen and thus the uppermost line (first line) is scanned last. FIG. 4 shows processing in the period of the n-th frame, which is at any certain frame position, and processing in the period of the n+1-th frame, which is the next frame of the n-th frame. Similar processing is continuously executed also after the processing of the n+1-th frame period.

One frame period is set to e.g. 1/60 periods, and divided into the first half and the second half as shown in FIG. 4. The first half is defined as the period during which the backlight is turned on while the second half is defined as the period during which it is turned off. Reading-out of a light reception signal is carried out in each of the backlight-ON period and the backlight-OFF period.

Furthermore, each of the backlight-ON period and the backlight-OFF period is divided into two halves. In the period of the n-th frame, a pixel electrode drive line G1 for displaying scans the lower half of the screen in the first half of the backlight-ON period, so that the displaying state of these lines is rewritten to the image corresponding to the n-th frame period. In contrast, the second half of the backlight-ON period is defined as a pause period during which the scan line is not changed. Furthermore, in the first half of the backlight-OFF period, the drive line G1 scans the upper half of the screen, so that the displaying state of these lines is rewritten to the image corresponding to the n-th frame period. In contrast, the second half of the backlight-OFF period is defined as a pause period during which the scan line is not changed.

As for the light reception processing, the following operation is carried out. Specifically, in the period of the n-th frame, processing RS1 for sequentially resetting the light reception signals of all the lines is executed in the first half of the backlight-ON period. In the second half of the backlight-ON period, processing RD1 for sequentially reading out the light reception signals of all the lines is executed so that the light reception signals accumulated in the respective sensors in a certain period are read out. Similarly, in the first half of the backlight-OFF period, processing RS2 for sequentially resetting the light reception signals of all the lines is executed. In the second half of the backlight-OFF period, processing RD2 for sequentially reading out the light reception signals of all the lines is executed so that the light reception signals accumulated in the respective sensors in a certain period are read out.

In the above-described manner, two times of reading out of light reception signals are carried out in one frame: the reading-out when the backlight is in the ON-state and thus emits light and the reading-out when it is in the OFF-state and thus the light emission thereof is stopped. The signals arising from the two times of reading out in one frame are input to a frame memory (not shown) in the light reception signal processor 13, and the difference is detected for the signal of each pixel position. The difference signals are transmitted to the input information analyzer 14 as difference light reception signals from which noise has been eliminated.

Figure 5:
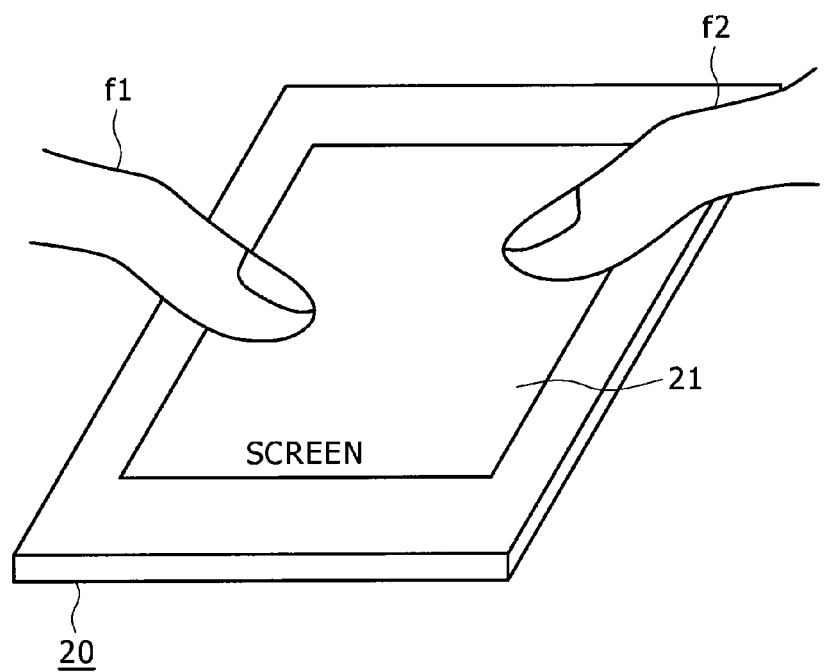
FIG. 5 is a perspective view showing a device shape example according to an embodiment.

FIG. 5 is a diagram illustrating an example of the shape of the display of the present embodiment. The example of FIG. 5 is constructed as e.g. a small and thin display that is portable for a user. A user (operator) touches the display plane of the display area 21 of the I/O display panel 20 with his/her fingers f1 and f2, which enables the user to operate the display.

Figure 6:
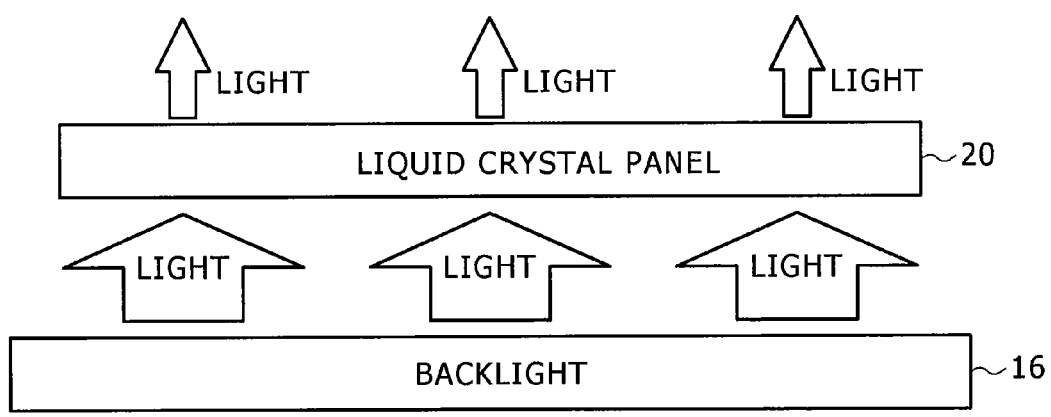
FIG. 6 is a schematic diagram showing an example of a light emission state (transmissive liquid crystal display) according to an embodiment.
Figure 7:
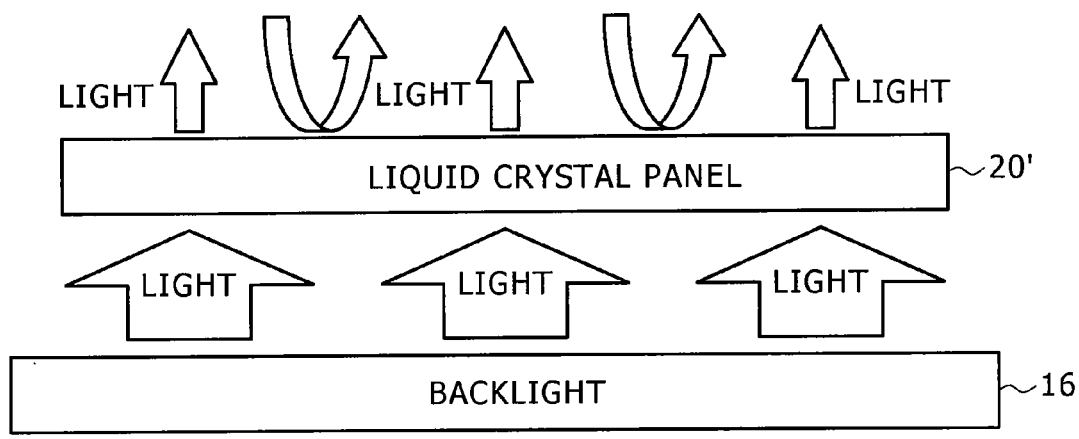
FIG. 7 is a schematic diagram showing an example of a light emission state (semi-transmissive liquid crystal display) according to an embodiment.
Figure 8:
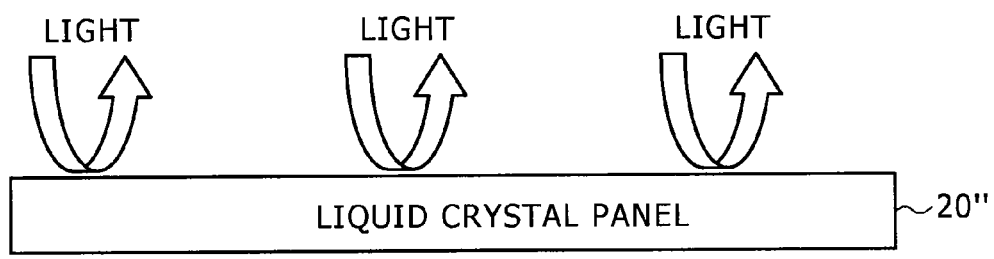
FIG. 8 is a schematic diagram showing an example of a light emission state (reflective liquid crystal display) according to an embodiment.

Examples of the displaying state of a liquid crystal display will be described below with reference to FIGS. 6 to 8. FIG. 6 shows a transmissive liquid crystal display. FIG. 7 shows a semi-transmissive liquid crystal display. FIG. 8 shows a reflective liquid crystal display. These drawings schematically show the displaying state (light emission state) of the respective systems.

Referring initially to FIG. 6, in a transmissive liquid crystal display, light from the backlight 16 enters the backside of the I/O display panel 20, so that part of the incident light is output as display light from the I/O display panel 20.

Referring next to FIG. 7, in a semi-transmissive liquid crystal display, light from the backlight 16 enters the backside of an I/O display panel 20', so that part of the incident light is output as display light from the I/O display panel 20'. Furthermore, the reflection of external light incident on the face of the I/O display panel 20' is also output as the display light.

Referring next to FIG. 8, in a reflective liquid crystal display, the reflection of external light incident on the face of an I/O display panel 20" is output as its display light.

Although the configuration of FIG. 1 includes the backlight 16, the present embodiment can be applied to a liquid crystal display having any of the configurations of FIGS. 6, 7 and 8.

Figures 9, 10:
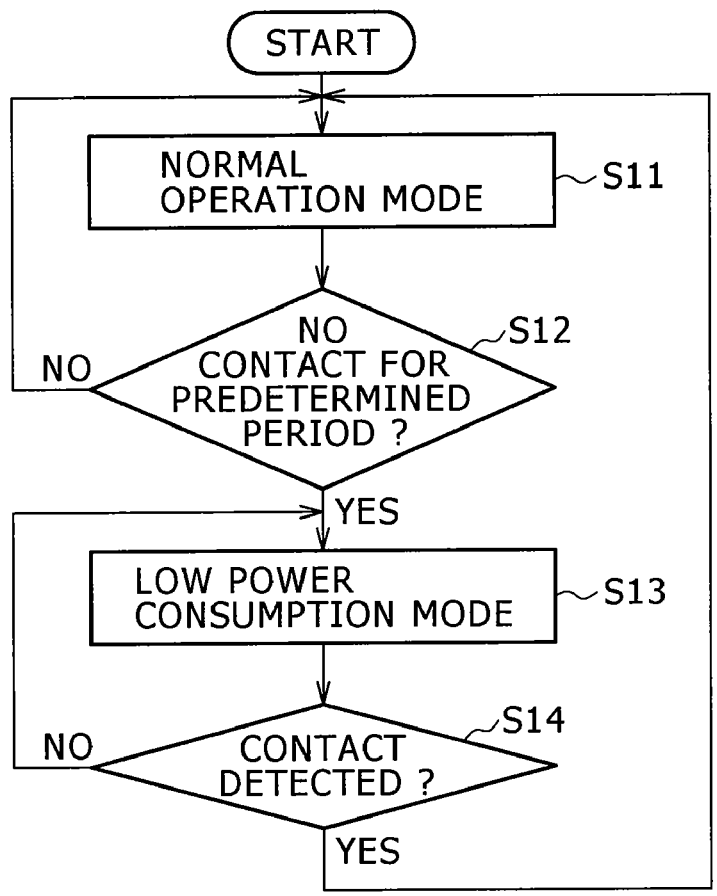
FIG. 9 is a flowchart showing an example of mode changes according to an embodiment.
FIG. 10 is an explanatory diagram showing an example of operation of the respective modes (Example 1) according to an embodiment.
Figure 13:
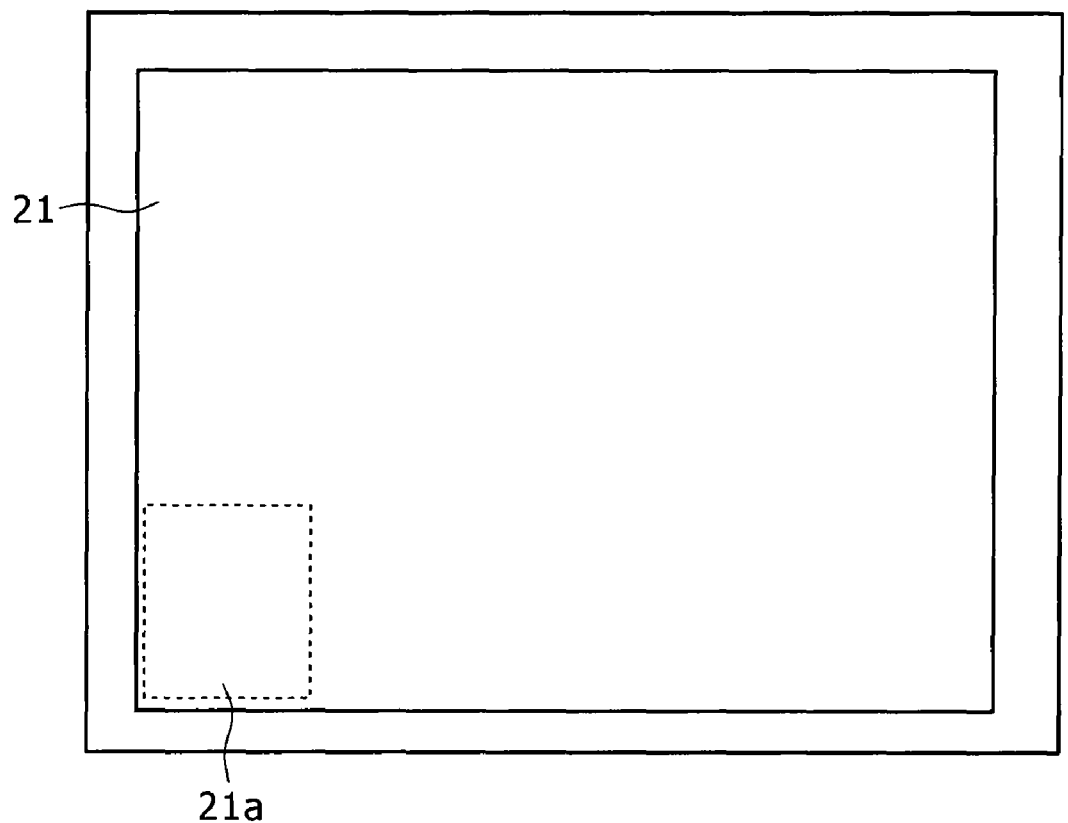
FIG. 13 is an explanatory diagram showing an example of sensing area limitation for the example of FIG. 12.

A description will be made below on an example of the processing states of displaying and detection of contact and so on in the display of the present embodiment with reference to the flowchart of FIG. 9. In the example of FIG. 9, two operation modes are defined: the normal operation mode and the low power consumption mode. Setting of these modes is carried out under control by the controller 11*b* for example. Referring to the flowchart of FIG. 9, initially, upon activation of the display in response to powering up of the display, the display enters the normal operation mode and thus implements image displaying and contact detection based on the normal operation (step S11). Furthermore, the display determines whether or not contact has been detected in the period from the activation of the display to the passage of a predetermined time period t (step S12). For example, it is determined whether no contact is detected for several minutes continuously.

If it is determined that contact has been detected, the operation in the normal operation mode in the step S11 is continued. In contrast, if no contact is detected in the period to the passage of the predetermined time t continuously, the operation mode is changed to the low power consumption mode (step S13). Also in the low power consumption mode, it is determined whether or not contact is detected (step S14). If there is no contact detection, the low power consumption mode in the step S13 is maintained. In contrast, if contact is detected, the operation mode returns to the normal operation mode of the step S11.

Examples of the settings of operation in the normal operation mode and the low power consumption mode will be described below with reference to FIGS. 10 to 12. In the example of FIG. 10 (Example 1), in both the normal operation mode and the low power consumption mode, normal displaying of input images is implemented as the image displaying operation of the display panel. Furthermore, in the normal operation mode, contact detection based on detection of received light is carried out with the cycle associated with the displaying (i.e., the cycle shown in FIG. 4). In contrast, in the low power consumption mode, the contact detection based on the amount of received light is carried out with a cycle longer than that in the normal operation mode. For example, the contact detection is carried out once per two frames, or with a longer cycle.

According to the mode setting shown in FIG. 10, if the state where there is no contact (or proximity) to the display panel has continued to some extent, the cycle of light reception processing for contact detection becomes longer, which can correspondingly reduce power consumption in the display that concurrently implements displaying (output) and contact detection (input).

In the example of FIG. 11 (Example 2), in the normal operation mode, normal displaying of input images is implemented as the image displaying operation of the display panel. In the low power consumption mode, the displaying is stopped and the backlight 16 is also turned off. As for the contact detection based on detection of received light, in the normal operation mode, the detection is carried out in the normal state. The expression "detection in the normal state" refers to processing for accurately detecting contact by detecting the difference between the data of light reception when the backlight 16 is in the on-state and that when it is in the off-state as shown in FIG. 4. In contrast, in the low power consumption mode, the backlight 16 is kept at the off-state. Therefore, contact detection is carried out in the backlight-OFF state. The contact detection in this state is equivalent to processing of detecting changes of the amount of received light due to changes of the input state of external light, and therefore involves inferior detection accuracy compared with that by the above-described processing of obtaining difference data. However, contact can be detected to some degree.

According to the mode setting shown in FIG. 11, if the state where there is no contact (or proximity) to the display panel has continued to some extent, displaying is not implemented, which can correspondingly reduce power consumption in the display that concurrently implements displaying (output) and contact detection (input).

In the example of FIG. 12 (Example 3), in both the normal operation mode and the low power consumption mode, normal displaying of input images is implemented as the image displaying operation of the display panel. Furthermore, in the normal operation mode, contact detection based on detection of received light is carried out for the entire screen with the cycle associated with the displaying (i.e., the cycle shown in FIG. 4). In contrast, in the low power consumption mode, the contact detection based on the amount of received light is carried out only in a specific area in the screen 21. Specifically, referring to FIG. 13 for example, in the normal operation mode, images are displayed on the entire display area 21. Furthermore, the entire display area 21 serves as a sensor area so that contact to any position on the surface of the display area 21 can be detected. In contrast, in the low power consumption mode, displaying is implemented similarly to the normal operation mode. However, contact detection is carried out only in a specific area 21a at a corner in the screen 21 or the like. Therefore, light reception operation is not carried out in the region outside the specific area 21a.

According to the mode setting shown in FIG. 12, if the state where there is no contact (or proximity) to the display panel has continued to some extent, contact detection is implemented only in a specific area, which can correspondingly decrease power consumed in light reception and conversion into light reception signals. Therefore, power consumption in the display that concurrently implements displaying (output) and contact detection (input) can be reduced. In the processing shown in FIG. 13, a button indication may be made in the specific area 21a as displaying on the screen 21, and a notification such as "please touch this area for operation" may be indicated to a user for example.

The respective kinds of processing shown in FIGS. 10 to 12 may be combined to define operation in the respective modes. Specifically, for example, during the backlight-OFF period in the low power consumption mode according to the setting of FIG. 11, the cycle of contact detection based on light reception may be longer than that of the normal operation mode. Furthermore, also at the time of contact detection only in a specific area according to the setting of FIG. 12, the cycle of contact detection based on light reception may be longer than that of the normal operation mode.

In one setting example of the above-described embodiment, the backlight is turned off in the low power consumption mode. Alternatively, the luminance of the backlight may be lowered than that in the normal mode, instead of the turning off thereof.

The above-described embodiment is applied to a liquid crystal display as an example of a display panel. However, embodiments of the present invention can be applied also to a display based on another configuration as long as the display can include light-receiving elements.

Figure 14:
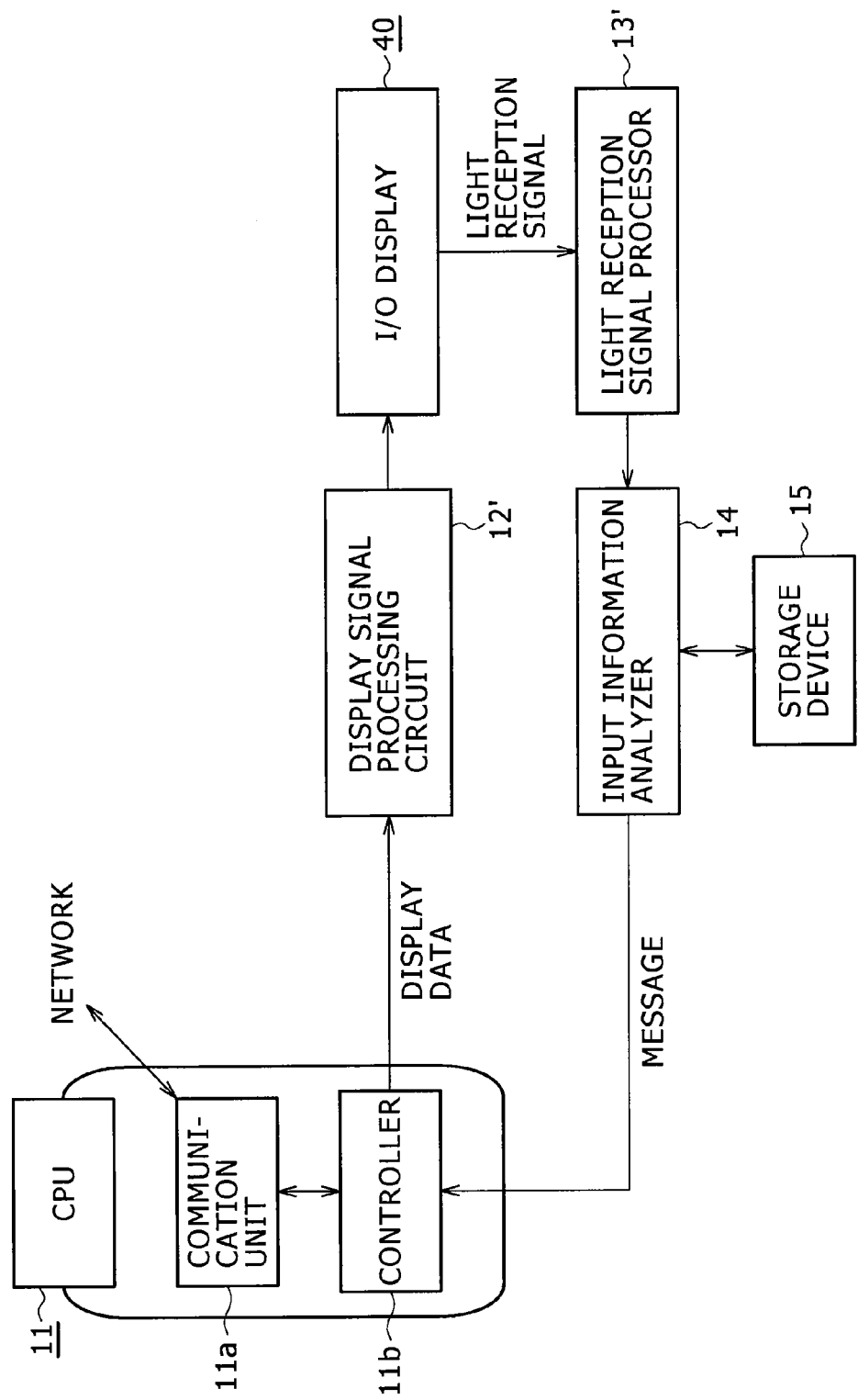
FIG. 14 is a block diagram showing a configuration example of a display according to another embodiment.

For example, an embodiment of the invention can be applied to an EL display. FIG. 14 is a block diagram showing a configuration example of a display as the EL display. The same components in FIG. 14 as those in the liquid crystal display of FIG. 1 are given the same numerals. In the EL display, a display signal processing circuit 12' drives an EL display panel (I/O display panel) 40, and a light reception signal processor 13' executes processing of detecting signals from light-receiving elements in the EL display panel 40. The EL display panel 40 is a self-luminous display unit and hence no backlight is required, in contrast to the configuration of FIG. 1.

Figure 15:
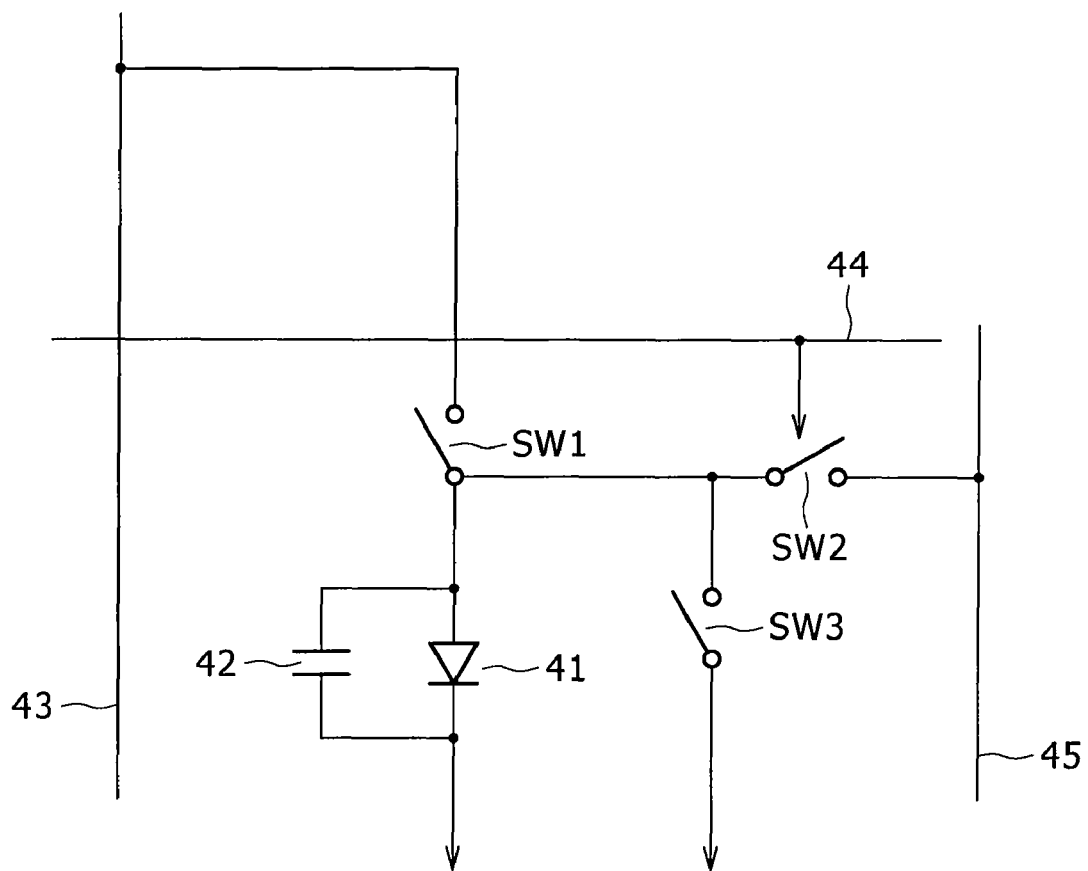
FIG. 15 is a connection diagram showing a configuration example of a pixel according to another embodiment.

FIG. 15 is a diagram showing a configuration example of each pixel in the EL display to which the embodiment is applied. In FIG. 15, a light-emitting element 41 of an organic EL display is indicated as a light emitting diode, and a parasitic capacitor 42 is involved in the light emitting diode 41. To display images, display data is supplied from a display data signal line 43 via a switch SW1 to the light-emitting element 41. Therefore, a display period (light emission period) is defined as the turning-on period of the switch SW1.

On the other hand, in the period during which the light emission of the light-emitting element 41 is stopped, charges are accumulated in the parasitic capacitor 42 of the light-emitting element 41 depending on the amount of light incident on the surface of the display panel. The accumulated charges are read out to a reception data signal line 45 in response to turning on of a switch SW2. At the start of a light reception period, charges that have been accumulated in the parasitic capacitor 42 at the time of light emission should be discharged by instantaneously turning on a reset switch SW3. The turning on and off of the switch SW2 is controlled by a signal obtained through a read-out line selection lead 44.

Constructing such an I/O display panel of the organic EL display type allows processing for detecting contact or proximity to the panel, with images being displayed. In this configuration, realization of both displaying processing and light reception processing is achieved by dividing each one field period into two periods and defining these two periods as a display period and a light reception period, respectively. By using an I/O display panel having this configuration and executing processing in the normal operation mode and the low power consumption mode described with reference to FIGS. 9 to 12, similar power consumption reduction can be achieved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device that implements image displaying and light reception alternately, the display device comprising:
   a plurality of display elements arranged in a matrix;
   a plurality of light-receiving elements disposed adjacent to the plurality of display elements, the display elements and the light-receiving elements are offered by a common element that implements displaying and light reception alternately;
   a position detector;
   a processor;
   a backlight disposed on a backside of a surface on which the display elements are arranged; and
   a memory device storing instructions which when executed by the processor, cause the processor to operate with the plurality of display elements, the plurality of light-receiving elements, the position detector, and the backlight to:
   (a) determine a position of contact or proximity to a display plane based on a light reception signal arising from light reception;
   (b) in a predetermined state, determine whether a presence of contact or proximity occurs;
   (c) in response to the presence of contact or proximity, shift a displaying state and a position detection state from a low power consumption mode to a normal operation mode;
   (d) in the normal operation mode:
      implement displaying of images according to a first cycle,
      implement detection of contact or proximity based on a light reception signal arising from light reception by all of the plurality of light-receiving elements according to the first cycle, and
      continuously cycle the backlight between an on-state and an off-state,
      wherein detection of contact or proximity in the normal operation mode occurs by detecting the difference between the data of light reception when the backlight is in the on-state and when the backlight is in the off-state; and
   (e) in the low power consumption mode:
      stop displaying of images,
      implement detection of contact or proximity based on a light reception signal arising from light reception by the plurality of light-receiving elements with a second cycle longer than the first cycle of detection of contact or proximity in the normal operation mode, and only based on a light reception signal arising from light reception by the light-receiving element in a specific area on the display plane smaller than that of the normal operation mode, and
      maintain the backlight at the off-state,
      wherein detection of contact or proximity in the low power consumption mode occurs by detecting only changes of the input state of external light with the backlight at the off-state.

2. The display device of claim 1, wherein:
   (a) the first cycle includes a first number of frames; and
   (b) the second cycle includes a second number of frames which is longer than said first number of frames.

3. The display device of claim 1, wherein the specific area on the display plane is a single corner of the display plane.

* * * * *